(12) United States Patent
Bakewell et al.

(10) Patent No.: US 12,036,872 B2
(45) Date of Patent: Jul. 16, 2024

(54) CONTROLLER AND METHOD OF CONTROLLING SPEED OF A VEHICLE

(71) Applicant: JAGUAR LAND ROVER LIMITED, Coventry (GB)

(72) Inventors: Ryan Bakewell, Warwickshire (GB); Matthew Hancock, Warwickshire (GB); Olivier Roques, Warwickshire (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 953 days.

(21) Appl. No.: 16/971,051

(22) PCT Filed: Feb. 25, 2019

(86) PCT No.: PCT/EP2019/054633
§ 371 (c)(1),
(2) Date: Aug. 19, 2020

(87) PCT Pub. No.: WO2019/162514
PCT Pub. Date: Aug. 29, 2019

(65) Prior Publication Data
US 2021/0086625 A1    Mar. 25, 2021

(30) Foreign Application Priority Data
Feb. 26, 2018 (GB) .................................... 1803013

(51) Int. Cl.
*B60L 15/10* (2006.01)
(52) U.S. Cl.
CPC .................................. *B60L 15/10* (2013.01)

(58) Field of Classification Search
CPC ....................................................... B60L 15/10
See application file for complete search history.

(56) References Cited

U.S. PATENT DOCUMENTS

| 5,457,363 A | 10/1995 | Yoshii et al. |
| 6,078,860 A | 6/2000 | Kerns |
| (Continued) | | |

FOREIGN PATENT DOCUMENTS

| CN | 1665697 A | 9/2005 |
| CN | 101423026 A | 5/2009 |
| (Continued) | | |

OTHER PUBLICATIONS

European Patent Office, Office Action Issued in Application No. 19709385.9, Dec. 16, 2022, Germany, 4 pages.
(Continued)

*Primary Examiner* — Michael D Lang
(74) *Attorney, Agent, or Firm* — McCoy Russell LLP

(57) ABSTRACT

A controller (201) for a vehicle (100), a system (200), a vehicle (100), a method (600), a computer program (204) and a non-transitory computer-readable storage medium (203) are disclosed. The controller (201) comprises means to receive an indication of a user selected direction of travel and an indication of the direction of motion of the vehicle (100). The controller (201) is configured to determine a proposed torque value in dependence on the direction of motion being an opposite direction to the selected direction of travel. The controller (201) also includes means to provide an output signal (403) configured to cause a motor (102) to apply torque, in dependence on the proposed torque value, to oppose motion in the opposite direction.

17 Claims, 10 Drawing Sheets

(56) References Cited

U.S. PATENT DOCUMENTS

| | | |
|---|---|---|
| 6,124,645 A | 9/2000 | Jones et al. |
| 2004/0178754 A1 | 9/2004 | Anwar et al. |
| 2005/0187671 A1 | 8/2005 | Nada |
| 2005/0211478 A1 | 9/2005 | Sakuma et al. |
| 2009/0112386 A1 | 4/2009 | Saitoh et al. |
| 2011/0022276 A1 | 1/2011 | Thaduvayi et al. |
| 2011/0045947 A1 | 2/2011 | Kaltenbach et al. |
| 2013/0090800 A1* | 4/2013 | Nakamura ......... B60L 15/2063 701/22 |
| 2015/0224976 A1 | 8/2015 | Wang et al. |
| 2016/0026402 A1 | 1/2016 | Alcantara et al. |
| 2016/0082972 A1 | 3/2016 | Fairgrieve et al. |

FOREIGN PATENT DOCUMENTS

| | | |
|---|---|---|
| CN | 103569129 B | 3/2016 |
| DE | 102014009856 A1 | 1/2016 |
| EP | 1035344 A2 | 9/2000 |
| EP | 1630054 A1 | 3/2006 |
| EP | 2546496 A1 | 1/2013 |
| EP | 2589508 A1 | 5/2013 |
| EP | 2604461 A1 | 6/2013 |
| GB | 2537929 A | 11/2016 |
| JP | H05191904 A | 7/1993 |
| JP | 3632301 B2 | 3/2005 |
| JP | 2006311644 A | 11/2006 |
| WO | 2008077352 A1 | 7/2008 |
| WO | 2014175195 A1 | 10/2014 |

OTHER PUBLICATIONS

European Patent Office, Office Action Issued in Application No. 19705523.0, Dec. 19, 2022, Germany, 5 pages.
State Intellectual Property Office of the People's Republic of China, Office Action and Search Report Issued in Application No. 201980015128.6, Dec. 27, 2022, 12 pages. (Submitted with Partial Translation).
International Search Report and Written Opinion, PCT/EP2019/054633, Jul. 9, 2019.
Combined Search and Examination Report, GB1803013.0, Jul. 23, 2018.
State Intellectual Property Office of the People's Republic of China, Office Action and Search Report Issued in Application No. 201980015068.8, Dec. 8, 2022, 21 pages. (Submitted with Partial Translation).
State Intellectual Property Office of the People's Republic of China, Office Action and Search Report Issued in Application No. 201980015068.8, Nov. 29, 2023, 21 pages.

* cited by examiner

CONTROLLER AND METHOD OF CONTROLLING SPEED OF A VEHICLE

CROSS-REFERENCE TO RELATED APPLICATIONS

This application is a 371 of International Application No. PCT/EP2019/054633, filed Feb. 25, 2019, which claims priority to GB Patent Application 1803013.0, filed Feb. 26, 2018, the contents of both of which are incorporated by reference herein in their entirety.

TECHNICAL FIELD

The present disclosure relates to a controller and a method of controlling speed of a vehicle. In particular, but not exclusively it relates to a controller and a method of controlling speed of a vehicle, such as a car.

Aspects of the invention relate to a controller, a system, a vehicle, a method, a computer program and a non-transitory computer-readable storage medium having instructions stored therein.

BACKGROUND

In vehicles with an internal combustion engine and an automatic transmission, it is common for a vehicle to have a "creep" function such that, without any torque being requested by the driver, a small amount of torque is provided to road wheels to cause movement of the vehicle by up 10 kilometres per hour. This "creep torque" can simplify low speed maneuvering because it allows a driver to modulate speed of the vehicle using just the brake pedal. The "creep" function originates from the behavior of the torque converter of the transmission of such vehicles, but it is not an inherent property of an electric vehicle. In some electric vehicles a creep function has been implemented in the powertrain controller, and in some of these vehicles the creep function is a selectable option to the driver. In other electric vehicles no such creep function is provided.

Without the creep torque function, when the vehicle comes to rest on a gradient, it may roll back in the opposite direction to the currently selected direction of travel. For example, when the driver has selected drive, rather than reverse, the vehicle may be driven forwards on an uphill gradient and stopped and allowed to roll backwards. Rolling backwards may be useful in some situations, for example when parking. The speed of the vehicle, when rolling against the selected direction of travel, can be limited by application of the brakes. However, a disadvantage of limiting speed in this way is that it can create poor NVH (noise vibration and harshness). It may also be difficult for the driver to control the movement of the vehicle, particularly if the vehicle is positioned on a very steep slope.

It is an aim of the present invention to address disadvantages of the prior art.

SUMMARY OF THE INVENTION

Aspects and embodiments of the invention provide a controller, a system, a vehicle, a method, a computer program and a non-transitory computer-readable storage medium as claimed in the appended claims.

According to an aspect of the invention there is provided a controller for a vehicle, the controller comprising: means to receive an indication of a user selected direction of travel; means to receive an indication of the direction of motion of the vehicle; means to determine a proposed torque value in dependence on the direction of motion being an opposite direction to the selected direction of travel; and means to provide an output signal configured to cause a motor to apply torque, in dependence on the proposed torque value, to oppose motion in said opposite direction.

This provides the advantage that a driver of the vehicle is able to allow the vehicle to roll in the opposite direction to the selected direction of travel without having to use the brakes to prevent the vehicle accelerating too quickly. Consequently, the NVH is reduced and also the speed of the vehicle is more easily controlled. For example, if the driver brings the vehicle to rest on an uphill gradient and allows the vehicle to roll backwards towards a parking space, the controller automatically causes torque to be applied to reduce acceleration of the vehicle as it rolls backwards. The driver is also free to modulate the speed of the vehicle by application of the brakes.

According to an aspect of the invention there is provided a controller for a vehicle, the controller being configured to: receive an indication of a user selected direction of travel; receive an indication of the direction of motion of the vehicle; determine a proposed torque value in dependence on the direction of motion being an opposite direction to the selected direction of travel; and provide an output signal configured to cause a motor to apply torque, in dependence on the proposed torque value, to oppose motion in said opposite direction.

According to an aspect of the invention there is provided a controller for a vehicle, the controller comprising: a port configured to receive an indication of a user selected direction of travel; a port configured to receive an indication of the direction of motion of the vehicle; an electronic memory device and having instructions stored therein; and an electronic processor electrically coupled to the electronic memory device and configured to access the electronic memory device and execute the instructions to determine a proposed torque value in dependence on the direction of motion being an opposite direction to the selected direction of travel; and an output port configured to provide an output signal configured to cause a motor to apply torque, in dependence on the proposed torque value, to oppose motion in said opposite direction.

In some embodiments the controller comprises means to receive signals indicative of user requests for torque received at an accelerator pedal, and the controller is configured to determine the proposed torque value in dependence on receiving no indication of a user request for torque in a period including the current time. This provides the advantage that, when the user is actuating the accelerator pedal, they remain in control of the torque provided by the motor.

In some embodiments the controller comprises means to receive a signal indicative of whether a creep mode has been selected, and provide the output signal only when creep mode is not selected.

In some embodiments the controller comprises means to receive an indication of speed of the vehicle; and the controller is configured to determine the proposed torque value in dependence on the speed of the vehicle. This provides the advantage that the torque provided by the motor may be arranged to limit speed of the vehicle in a controlled manner. For example, no torque may be provided at very low speeds and torque provided at higher speeds to prevent the vehicle rolling too quickly.

In some embodiments the proposed torque value is proportional to the speed of the vehicle.
}

In some embodiments the controller is configured to determine the proposed torque value in dependence on an indication of a rate of increase in speed of the vehicle and/or an indication of a gradient that the vehicle is positioned on. This provides the advantage that increased torque may be provided by the powertrain to resist rolling of the vehicle on steeper gradients where the acceleration of the vehicle would otherwise require high levels of brake torque.

In some embodiments the proposed torque value is arranged to be proportional to the rate of increase in speed of the vehicle and/or the gradient that the vehicle is positioned on.

In some embodiments the controller comprises means to receive an indication of speed of the vehicle; and the controller is configured to determine the indication of the rate of increase in speed of the vehicle.

In some embodiments the controller is a closed-loop controller having the speed of the vehicle as an input; and the controller is configured to determine proposed torque values that allow the speed of the vehicle to increase towards a predefined speed. This provides the advantage that the maximum speed that the vehicle will obtain will be quite predictable for the driver.

In some embodiments the controller is configured to provide the output signal to cause a motor of the vehicle to automatically provide torque to oppose motion in the opposite direction to the selected direction of travel, in dependence on receiving an indication that brakes of the vehicle are not being applied.

In some embodiments the controller comprises an electronic memory device and having instructions stored therein; and an electronic processor electrically coupled to the electronic memory device and configured to access the electronic memory device and execute the instructions to determine the proposed torque value.

In some embodiments the means to receive and/or the means to provide an output signal comprises a transceiver.

According to another aspect of the invention there is provided a system comprising the controller of any one of the previous paragraphs and a sensing means configured to sense speed of the vehicle and provide an indication of the speed to the controller.

In some embodiments the sensing means comprises a sensor configured to sense the rotational speed of an electric motor of the vehicle. This provides the advantage that accurate speeds for the vehicle may be obtained, even at very low speeds. Therefore the controller may be made aware of movement very soon after the vehicle rolls away from rest.

In some embodiments the system comprises an electric motor configured to produce torque in dependence on the proposed torque value provided by the controller.

In some embodiments the system comprises a user input device configured to provide a signal to the controller indicating selection or deselection of a creep mode in response to a corresponding user input.

In some embodiments the system comprises a user input device configured to provide a signal to the controller indicating a user selected direction of travel.

According to a further aspect of the invention there is provided a vehicle comprising the controller of any one of the previous paragraphs or the system of any one of the previous paragraphs.

According to yet another aspect of the invention there is provided a method of controlling speed of a vehicle, the method comprising: receiving an indication of a user selected direction of travel; receiving an indication of the direction of motion of the vehicle; determining a proposed torque in dependence on the direction of motion being an opposite direction to the selected direction of travel; and causing a motor to apply the proposed torque to oppose motion in said opposite direction.

In some embodiments the method comprises determining the proposed torque in dependence on a determination that no user request for torque is currently being received.

In some embodiments the method comprises receiving a signal indicative of whether a creep mode has been selected, and provide the output signal only when creep mode is not selected.

In some embodiments the method comprises determining the proposed torque value in dependence on a measured speed of the vehicle.

In some embodiments the proposed torque value is proportional to the measured speed of the vehicle.

In some embodiments the method comprises determining the proposed torque value in dependence on an indication of a rate of increase in the measured speed of the vehicle.

In some embodiments the proposed torque value is arranged to be proportional to the rate of increase in speed of the vehicle.

In some embodiments the method comprises receiving an indication of the measured speed of the vehicle from a sensor sensing the rotational speed of an electric motor of the vehicle or from a sensing means sensing the rotational speed of a road wheel.

In some embodiments the method comprises determining an indication of the speed of the vehicle from a received indication of a selected gear of a transmission system and an indication of measured speed received from a sensor sensing the rotational speed of an electric motor of the vehicle.

According to another aspect of the invention there is provided a computer program which when executed by a processor causes the processor to perform the method according to any one of the previous paragraphs.

According to yet another aspect of the invention there is provided a non-transitory computer-readable storage medium having instructions stored therein which when executed on a processor cause the processor to perform the method according to any one of the previous paragraphs.

According to a further aspect of the invention there is provided a method of controlling speed of a vehicle, the method comprising: receiving an indication of a user selected direction of travel; determining the direction of motion of the vehicle; and in dependence on the direction of motion being opposite to the selected direction of travel, providing an output signal to cause a motor to apply torque to oppose the motion of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
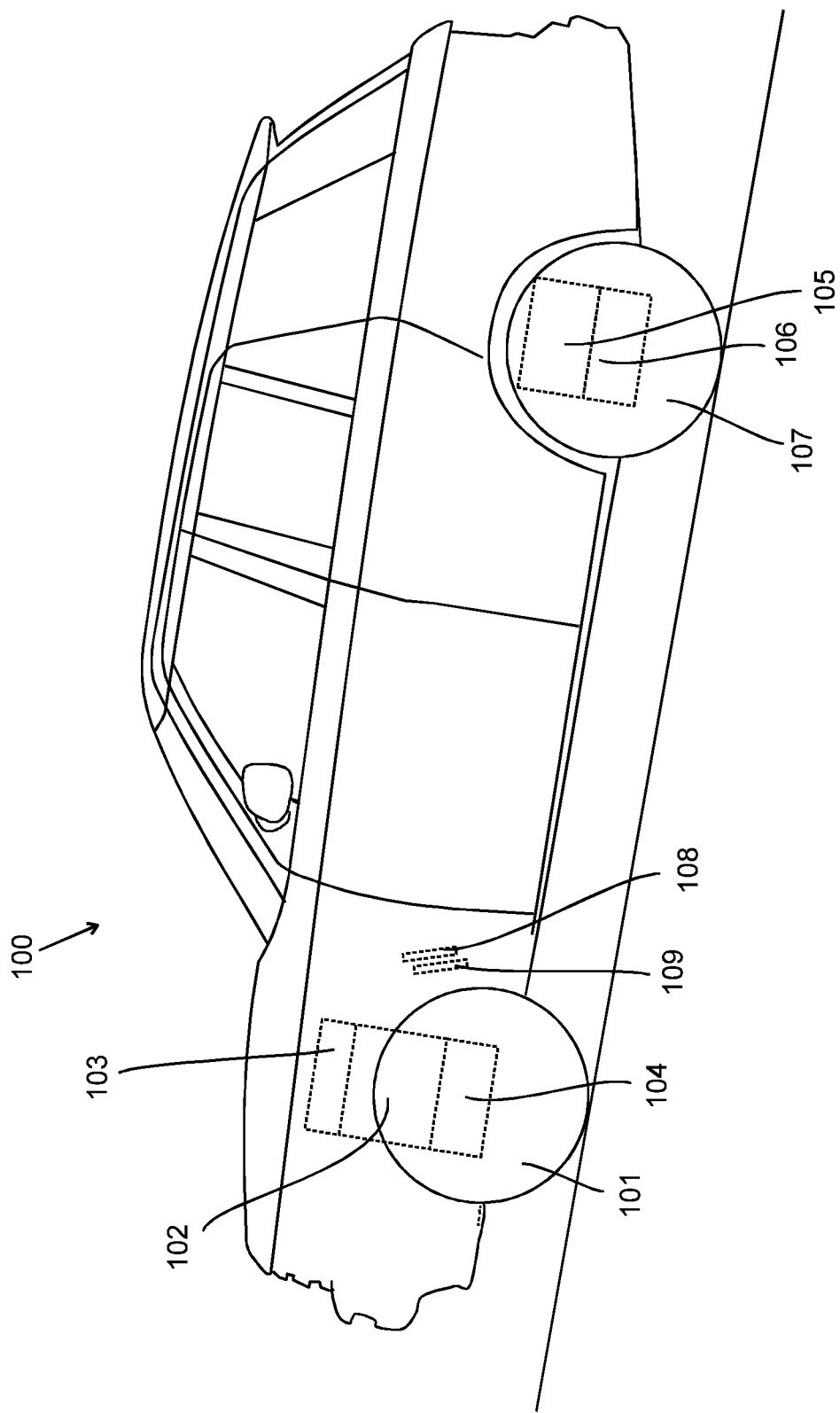
FIG. 1 shows a road vehicle embodying the present invention.

A road vehicle 100 embodying the present invention is shown in FIG. 1. In the present embodiment the vehicle 100 is a car having an electric motor 102 arranged to provide torque to front wheels 101 via a transmission system 104 under the control of a powertrain control module (PCM) 103. The vehicle 100 may also have a second electric motor 105 arranged to provide torque to rear wheels 107 via a second transmission system 106, but it will be appreciated that in other embodiments, the vehicle 100 may just have a single electric motor that drives the front wheels 101 and/or the rear wheels 107.

By way of example, the vehicle 100 is shown in FIG. 1 after having been driven up a hill and stopped on an uphill gradient of about 10 degrees to the horizontal. The vehicle 100 was brought to rest by the driver (not shown) releasing the accelerator pedal 108 and without depressing the brake pedal 109. The vehicle 100 may momentarily be stationary but due to the gradient it begins to roll backwards down the hill in the opposite direction to the selected direction of travel. However, the vehicle 100 is provided with a system (200 shown in FIG. 2) which automatically causes the first electric motor 102 and/or the second electric motor 105 to generate torque to oppose the backwards rolling of the vehicle 100, such that the acceleration of the vehicle 100 down the hill is reduced from what it otherwise could be.

In some embodiments, the system (200 shown in FIG. 2) may be configured to cause the ratio of the torque automatically provided by the front wheels 101 to the torque automatically provided by the rear wheels 107 to be varied in dependence on the gradient on which the vehicle 100 is positioned. When the vehicle 100 is positioned on a slope, the proportion of the weight of the vehicle 100 that rests on the lowermost wheels 101 or 107 is increased and the weight that rests on the uppermost wheels 101 or 107 is decreased. The system (200 shown in FIG. 2) is configured to increase the proportion of the torque that is applied through the lowermost wheels 101 or 107 to increase the likelihood that the wheels 101 and 107 will be able to provide the required traction. The proportion of the torque provided by the lowermost wheels 101 or 107 may be arranged to be proportional to the gradient on which the vehicle 100 is positioned.

In the present embodiment, the driver is still able to modulate the speed of the vehicle 100 as it rolls back down the hill by depression of the brake pedal 109, but the brake torque that is required to achieve a desired speed is reduced due to the torque provided by the electric motor(s) 102, 105. In dependence on the driver requesting brake torque that is above a threshold brake torque, the system (200 shown in FIG. 2) may be configured to reduce torque provided by the electric motor(s) 102, 105, so that the driver is provided with full control of the vehicle 100. For example, the threshold brake torque may be equal to the torque currently provided by the motor(s) 102, 105.

In an alternative example to that shown in FIG. 1, the vehicle 100 may come to rest after reversing up a hill and momentarily stop before rolling forwards down the hill, i.e. in the opposite direction to the selected backwards direction of travel. In such an example, the system (200 shown in FIG. 2) may automatically cause the first electric motor 102 and/or the second electric motor 105 to generate torque to oppose the forward rolling of the vehicle 100, such that the acceleration of the vehicle 100 down the hill is reduced from what it otherwise could be.

Figure 2:
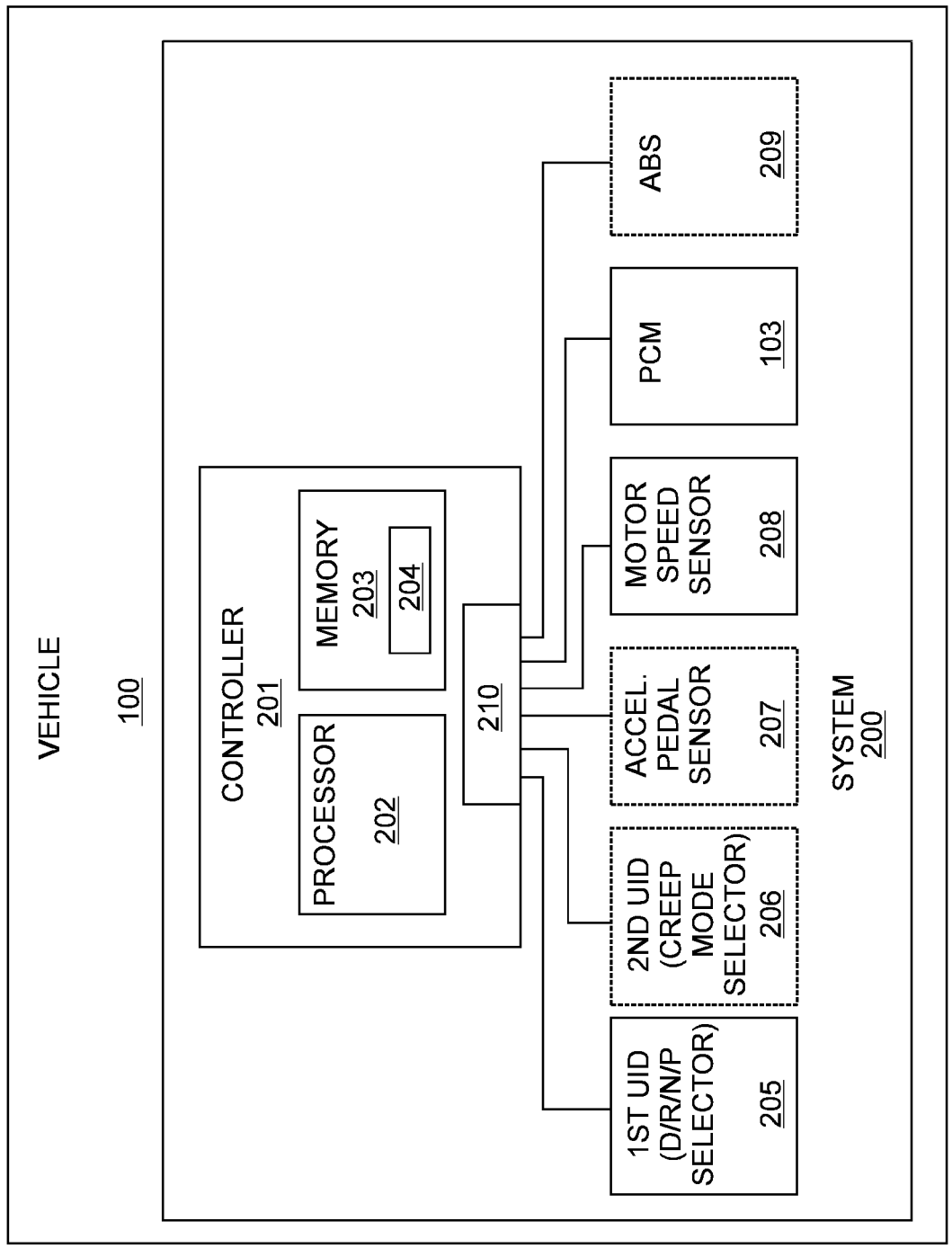
FIG. 2 shows a schematic diagram of a system for automatically causing the electric motor 102 of the vehicle to generate torque.

A schematic diagram of a system 200 for automatically causing the electric motor 102 and/or the electric motor 105 of the vehicle 100 to generate torque when the vehicle 100 is rolling in the opposite direction to a selected direction of travel is shown in FIG. 2. The system 200 comprises a controller 201. The controller 201 comprises an electronic processor 202 and an electronic memory device 203 having instructions 204 stored therein. The electronic processor 202 is electrically coupled to the electronic memory device 203 and it is configured to access the electronic memory device 203 and execute the instructions 204, to cause the controller 201 to perform the processes that will be described below. The controller 201 may comprise receiving means 210 to enable it to receive signals from other components of the vehicle 100. For example, the controller 201 may comprise a transceiver 210 having at least one port to enable the controller to communicate with other components of the vehicle 100 over a data bus such as a CAN (Controller Area Network) bus.

The system 200 includes a first user input device 205 configured to enable a driver of the vehicle 100 to select a direction of travel, i.e. either drive (forward) or reverse, or alternatively select neutral or park. The first user input device 205 therefore enables the driver to make selections in a similar manner to a gear selection device in a vehicle that has an internal combustion engine and selectable gears. The controller 201 may have a port configured to receive the indications of a user selected direction of travel from the first user input device 205.

In some embodiments, the vehicle 100 does not have a creep function. However, in embodiments in which the vehicle 100 has a creep function, the system 200 may also comprise a second user input device 206 to enable the driver to select or deselect the creep function. In such embodiments the controller 201 may have a port configured to receive indications of whether or not the creep function is selected.

The system 200 may include an accelerator pedal sensor 207 configured to provide an indication to the controller 201 when the accelerator pedal 109 is being depressed.

The system 200 may also include a vehicle speed sensing means comprising a motor speed sensor 208. The controller 201 may have a port configured to receive signals from the motor speed sensor 208 indicative of the rotational velocity of the electric motor 102, which is also indicative of the speed of the vehicle 100. i.e. the speed of the vehicle 100 may be calculated from the rotational velocity and knowledge of the transmission system 104.

In the present embodiment, due to the gear ratio of the transmission system 104, the electric motor 102 may turn many times for each revolution of the driven wheels 101. Consequently, measurement of the rotational velocity of the electric motor 102 may provide a very accurate indication of speed of the vehicle 100, even at very low speeds of the vehicle 100.

In an embodiment in which the transmission 104 has several different selectable gears each having a different gear ratio, the controller 201 may receive an indication of the currently selected gear and determine an indication of the speed of the vehicle 100 in dependence on the rotational velocity of the electric motor 102 and the currently selected gear.

It should be noted that the word "speed" in general use refers to a scalar quantity equal to the magnitude of a velocity, and therefore it is always positive. However, "speed of the vehicle", measured speed" and "vehicle speed" as used herein refer to a scalar quantity with a positive sign for forward motion of the vehicle 100 and a negative sign for backwards motion of the vehicle.

In an alternative embodiment, the controller 201 may have a port configured to receive indications of speed of the vehicle 100 from an alternative vehicle speed sensing means, such as from an antilock braking system 209 of the vehicle 100.

The controller 201 is operably connected to the powertrain control module 103 to enable it to provide output signals to the PCM 103 to request torque from the electric motor 102 when required. The controller 201 may be arranged to provide output signals to the PCM 103 via a port of the transceiver 210.

Figure 3:
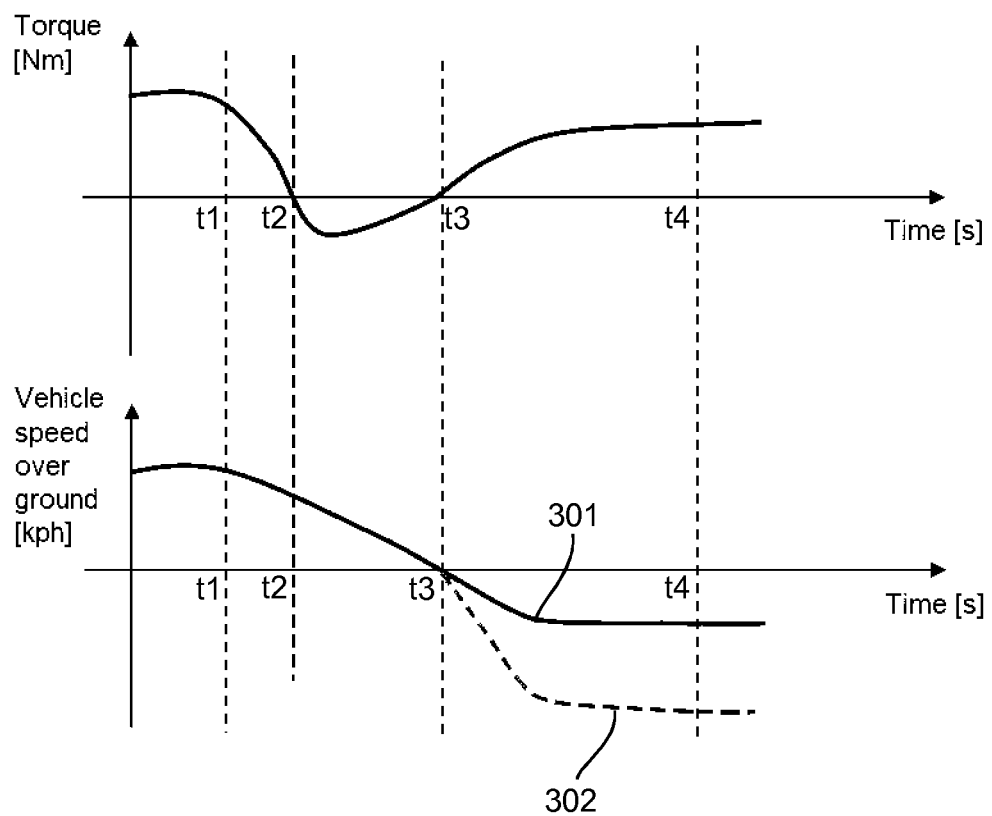
FIG. 3 shows graphs illustrating an example of the operation of the system.

Graphs illustrating an example of the operation of the system 200 are shown in FIG. 3. FIG. 3 shows two graphs. The upper graph is a plot of torque generated by the electric motor 102 against time and the lower graph is a plot of speed of the vehicle 100 against time. The solid line 301 on the lower graph shows the actual speed of the vehicle 100 with the system 200 operational, and the dashed line 302 shows the speed that the vehicle 100 would have had if the system 200 were not operational.

Initially in the graphs of FIG. 3, torque is generated by the motor 102 in response to a user demand for torque received at the accelerator pedal 108, and the vehicle has motion in the selected direction of travel. At time t1 the accelerator pedal 108 is being released and the torque generated by the motor 102 begins to reduce. The speed of the vehicle 100 also reduces in a corresponding manner.

At time t2 the torque has reduced to zero and from then until t3, when the vehicle 100 becomes stationary, the torque provided by the motor 102 is negative; the negative torque assists with reducing the speed of the vehicle 100. Between times t2 and t3, the negative torque reduces as the speed reduces, so that at t3, when the speed is zero, the torque is also zero. From time t3 onwards, the vehicle 100 rolls backwards, as indicated by the negative speed of the solid line 301 on the graph. However, in dependence on determining that the speed of the vehicle 100 is in the opposite direction to the selected direction of travel, the controller 201 has provided an output signal to the PCM 103 to cause the motor 102 to generate positive torque. Therefore, the increase in speed of the vehicle 100, as shown by the line 301, is less than it otherwise would be, as shown by the dashed line 302.

Figure 4:
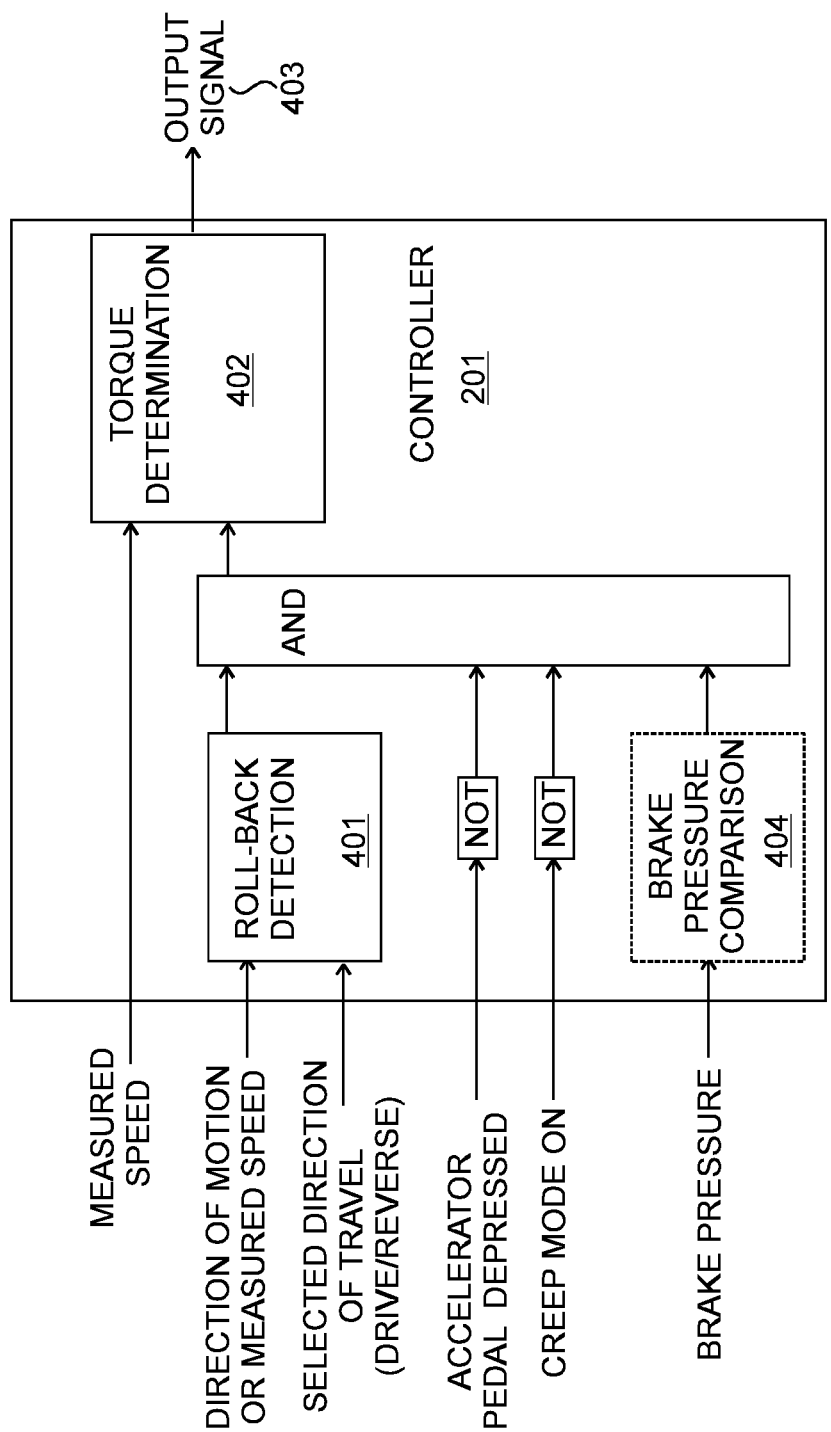
FIG. 4 shows a functional flow block diagram illustrating operations performable by controller embodying the present invention.

A functional flow block diagram illustrating operations performable by the controller 201 is shown in FIG. 4. The controller 201 is configured to receive an indication of the direction of motion of the vehicle 100 or an indication of the measured speed of the vehicle 100, for example from the motor speed sensor 208, and also configured to receive an indication of the direction of travel selected by the user, for example, from the user input device 205. The controller 201 is configured to perform a roll-back detection function 401 to compare the direction of motion to the selected direction of travel and provide an output indicative of whether or not the direction of motion is the same as the selected direction of travel. That is, if the selected direction of travel is forwards (or drive is selected), the controller 201 provides an indication of whether or not the direction of motion is also forwards, and if the selected direction of travel is reverse, the controller 201 provides an indication of whether or not the direction of motion is also in reverse (backwards).

The controller 201 is also configured to perform a torque determination function 402 which receives the indication of the measured speed of the vehicle 100. In dependence on the roll-back detection function 401 indicating that the direction of motion of the vehicle 100 is opposite to the selected direction of travel, the torque determination function 402 determines a proposed torque value and provides an output signal 403 to the PCM 103 to cause the electric motor(s) 102 and/or 105 to apply torque in dependence on the proposed torque value, to oppose the motion of the vehicle 100.

The PCM 103 may be configured to cause the electric motor(s) 102, 105 to generate torque in dependence on torque requests received from the accelerator pedal sensor 207, and, in the absence of such a request, cause the electric motor(s) 102, 105 to generate torque in dependence on proposed torque values received via the output signal 403 from the controller 201.

In the present embodiment, the controller 201 also receives indications of requested torque from the accelerator pedal sensor 207 and indications of creep mode being selected. The controller 201 is configured to only determine a proposed torque value, and provide an output signal 403, when: the creep mode is not selected; a torque request is not currently being received; and the roll-back detection function 401 determines that the direction of motion of the vehicle 100 is opposite to the selected direction of travel.

By not providing an output 403 when the accelerator pedal sensor 207 indicates that the user is depressing the accelerator pedal 108, the driver is left in control of the torque provided by the electric motors 102 and 105 and so the driver may modulate the speed of the vehicle 100 using the accelerator pedal 108.

In alternative embodiments that do not have a creep function, the controller 201 may be configured to only determine a proposed torque value, and provide an output signal 403, when: a torque request is not currently being received; and the roll-back detection function 401 determines that the direction of motion of the vehicle 100 is opposite to the selected direction of travel.

In some embodiments, the controller 201 may be configured to receive indications of brake pressure applied by the braking system 209 caused by operation of the brake pedal 109. The controller 201 may be configured to perform a brake pressure comparison function 404 to determine if the brake pressure is exceeding a threshold pressure, and the torque determination function 402 may be configured to only provide an output signal 403 to cause the motor(s) 102, 105 to provide torque when the brake pressure is determined to be less than the threshold pressure. In addition, during periods when an output signal 403 is being provided to cause torque to be automatically provided by the motor(s) 102, 105, in response to receiving an indication that brake pressure is exceeding a threshold pressure, the controller 201 may be configured to cause the torque applied by the electric motor(s) 102, 105 to be reduced, so that full control is handed back to the driver.

Figure 6:
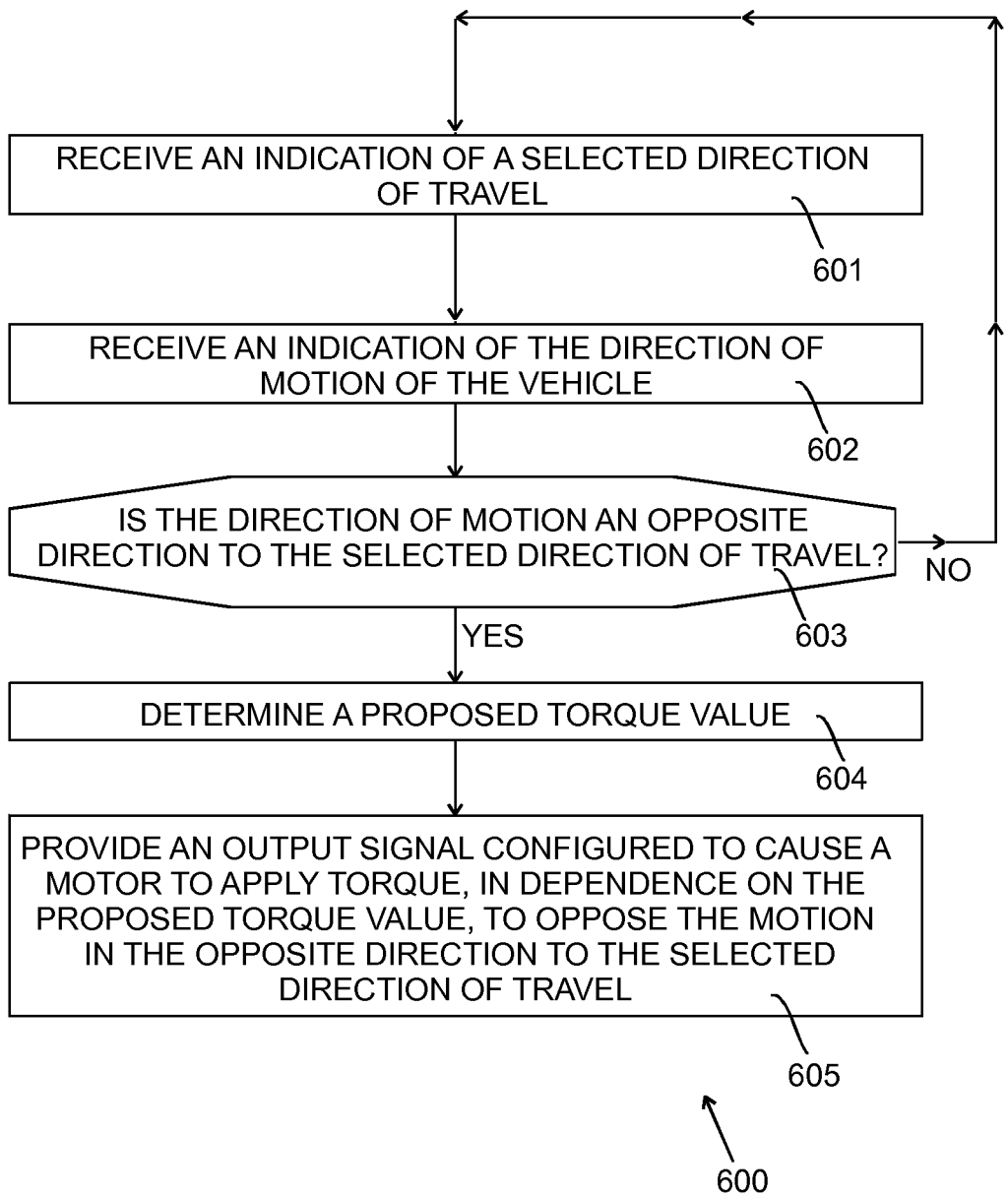
FIG. 6 shows a flowchart illustrating a method 600 performable by the controller of FIG. 4.

A flowchart illustrating a method 600 performable by the controller 201 is shown in FIG. 6. At block 601 of the method 600, an indication of a selected direction of travel (either forward (drive) or reverse) is received. At block 602 an indication of the direction of motion of the vehicle 100 is received, for example, from the motor speed sensor 208. At block 603 it is determined whether the direction of motion is an opposite direction to the selected direction of travel. If it is not, then blocks 601 to 603 are repeated.

If it is determined at block 603 that the direction of motion is an opposite direction to the selected direction of travel, then a proposed torque value is determined at block 604. An output signal is then provided at block 605 that is configured to cause a motor 102, 105 to apply a torque in dependence on the proposed torque value, to oppose motion in the opposite direction to the selected direction of travel.

Figure 7A:
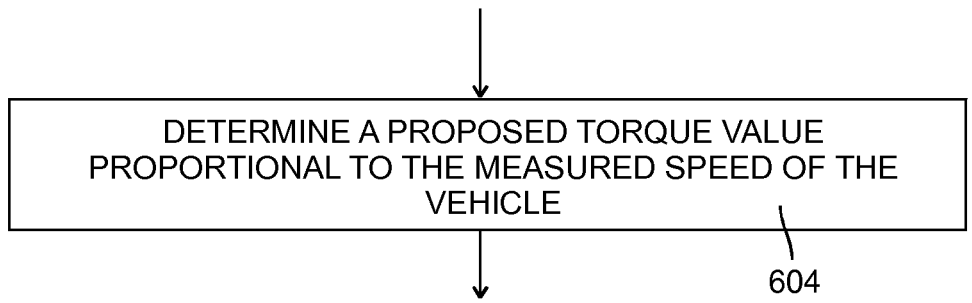
FIG. 7A shows more detail of a process performed in the method 600.
Figure 8A:
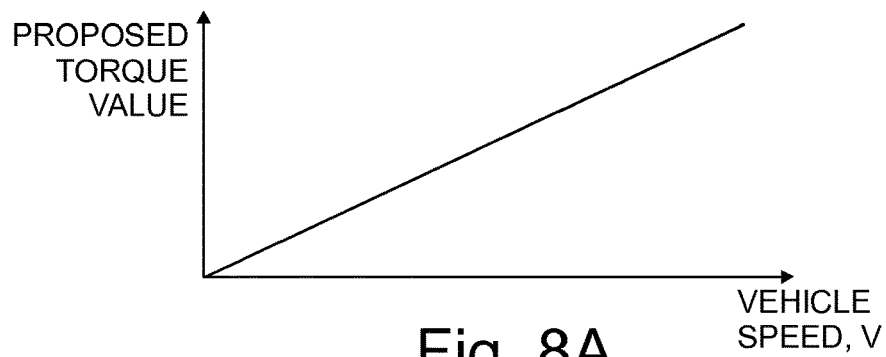
FIG. 8A shows a graph illustrating the relationship between a proposed torque value and the speed of the vehicle.

In the present embodiment, the proposed torque value is determined at block 604 in dependence on the indication of measured speed of the vehicle 100, and, as shown in FIG. 7A, the proposed torque value may be calculated from the indication of measured speed so that it is proportional to the measured speed. A graph of proposed torque value plotted against speed of the vehicle 100 is shown in FIG. 8A. In this embodiment the proposed torque value is directly proportional to the measured speed.

Figure 8B:
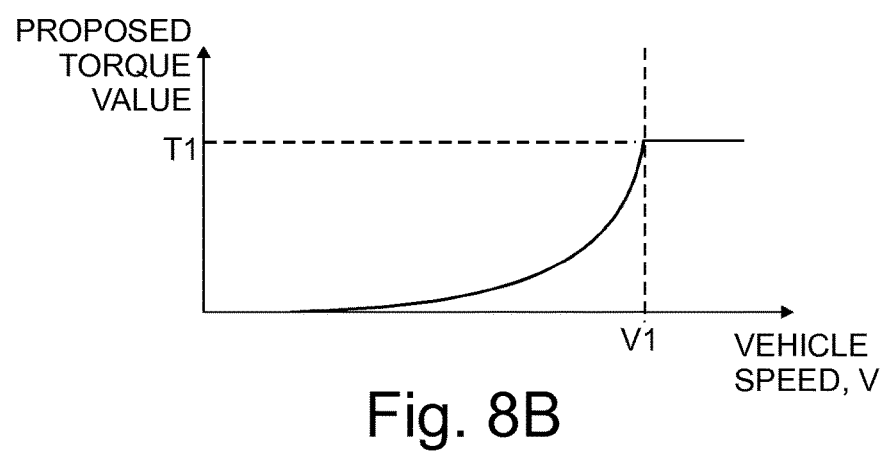
FIG. 8B shows a graph illustrating an alternative relationship between a proposed torque value and the speed of the vehicle.

An alternative embodiment is illustrated by the graph shown in FIG. 8B in which the rate of increase of proposed torque value with respect to the measured speed increases with the measured speed up to a vehicle speed V1, at which the proposed torque value T1 is at a maximum. By such an arrangement, the speed of the vehicle 100 is generally maintained below the vehicle speed of V1.

Figure 7B:
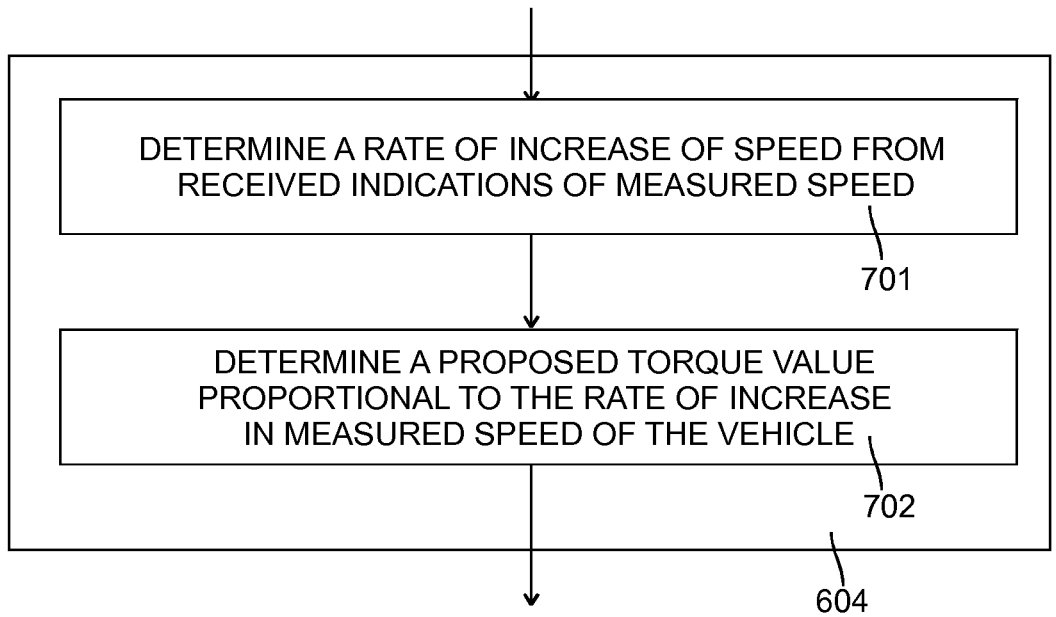
FIG. 7B shows detail of an alternative process that may be performed in the method 600.
Figure 8C:
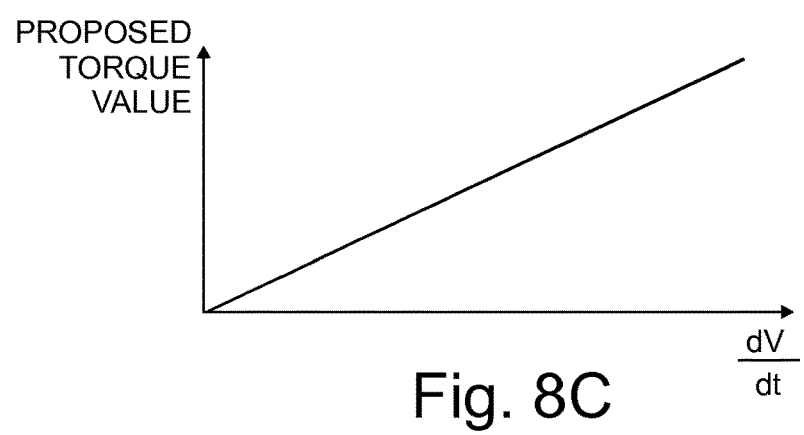
FIG. 8C shows a graph illustrating an alternative relationship between a proposed torque value and the rate of change of speed of the vehicle.

Another alternative embodiment is illustrated in FIG. 7B, which shows alternative processes that are performed at block 604 of the method 600. Within block 604, at block 701, a rate of increase of speed is determined from received indications of measured speed, and then at block 702 a proposed torque value is determined that is proportional to the rate of increase in speed of the vehicle. Thus, on a very steep gradient where the speed can increase rapidly, the torque values are also caused to rise rapidly. A graph illustrating such an embodiment is shown in FIG. 8C.

In further alternative embodiment, the proposed torque value at block 604 is determined in dependence on both the speed of the vehicle and the rate of increase of speed of the vehicle.

Figure 5:
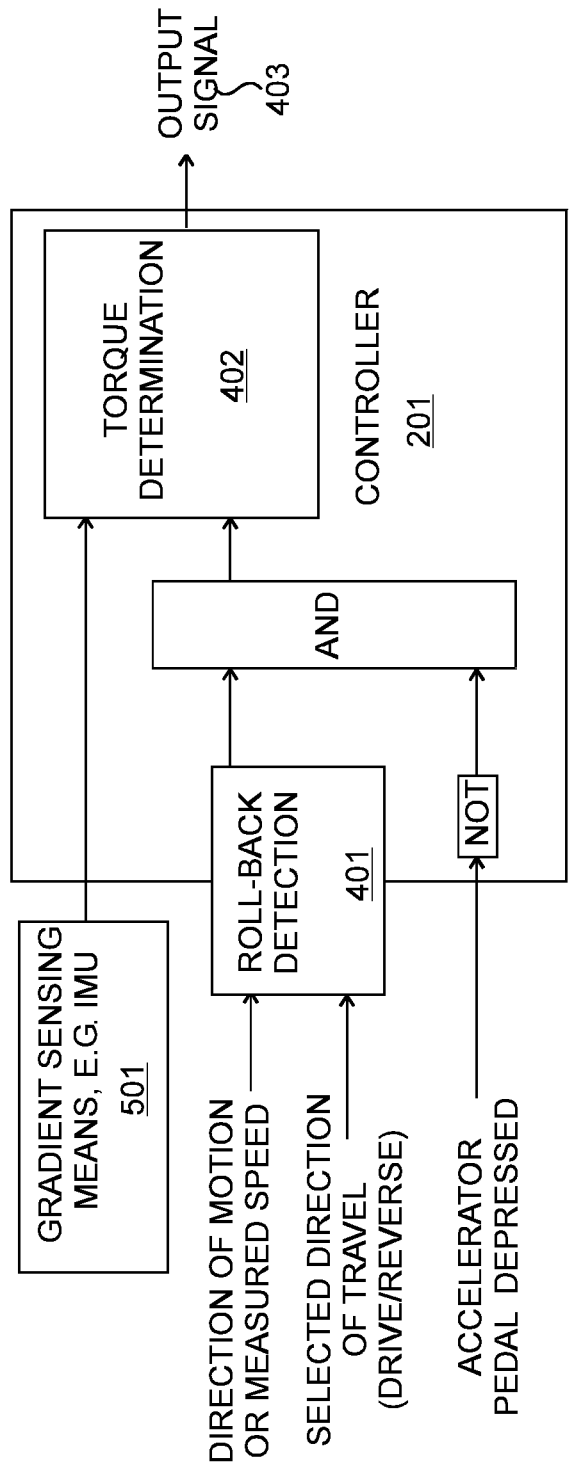
FIG. 5 shows a functional flow block diagram illustrating operations performable by another controller embodying the present invention.

A further alternative controller 201A embodying the present invention is illustrated by a functional flow block diagram shown in FIG. 5. The embodiment shown in FIG. 5 is similar to that shown in FIG. 4. The controller 201A is arranged to perform a roll-back detection function 401 by comparing the selected direction of travel with a received indication of the direction of motion or the received indication of measured speed of the vehicle.

The controller 201A is configured to perform a torque determination function 402 when the accelerator pedal is not depressed and the roll-back detection function 401 indicates that the selected direction of travel is different to the direction of motion of the vehicle 100.

Figure 8D:
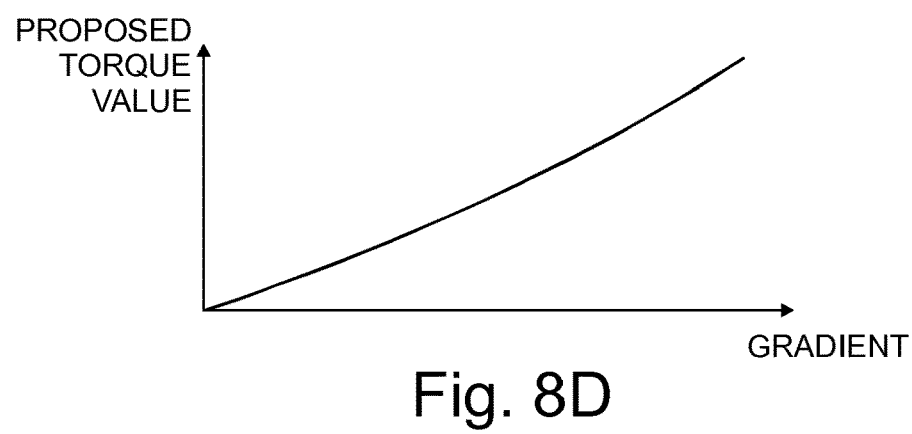
FIG. 8D shows a graph illustrating an alternative relationship between a proposed torque value and the gradient on which the vehicle is positioned.

However, the controller 201A of FIG. 5 differs from controller 201 of FIG. 4 in that, instead of receiving the indication of the measured speed, the torque determination function 402 receives an indication of the gradient on which the vehicle 100 is positioned from a gradient sensing means 501. The gradient sensing means 501 may comprise an inertial measurement unit (IMU). The torque determination function 402 is configured to determine proposed torque values in dependence on the received indication of gradient. A graph of proposed torque values generated by the controller 201A plotted against gradient is shown in FIG. 8D. In this embodiment the proposed torque value is proportional to the gradient, so that the torque requested by the output signal 403 increases as the gradient increases.

Figure 9:
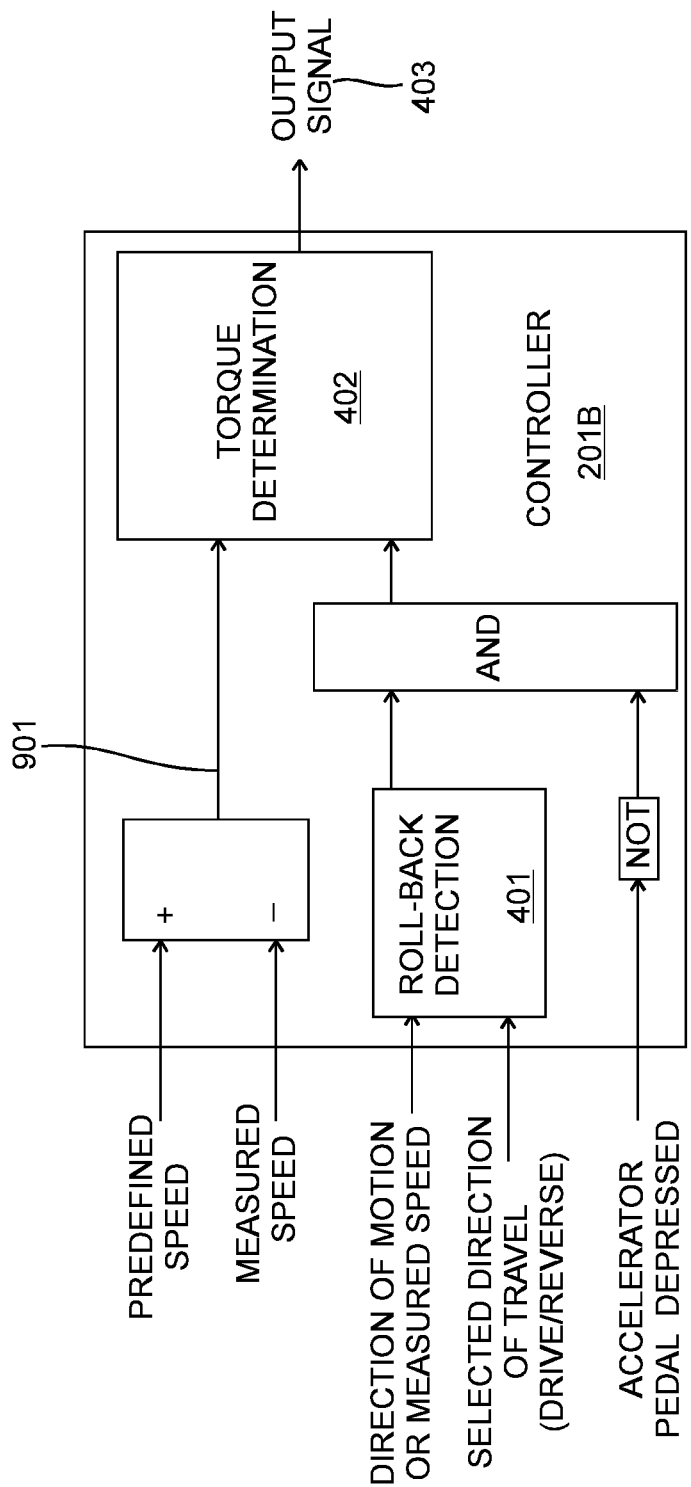
FIG. 9 shows a functional flow block diagram illustrating operations performable by yet another controller embodying the present invention.

A further alternative controller 201B embodying the present invention is illustrated by a functional flow block diagram shown in FIG. 9. Like the controller 201 of FIG. 4, the controller 201B is arranged to perform a roll-back detection function 401 by comparing the selected direction of travel with a received indication of the direction of motion or the received indication of measured speed of the vehicle. An indication that torque should be requested is received by the torque determination function 402, when both the accelerator pedal 108 is not being depressed and the direction of motion of the vehicle 100 is not the selected direction of travel, as determined by the roll-back detection function 401.

The controller 201B is a negative feedback controller arranged to allow the vehicle 100 to roll-back with speeds up to a predefined speed that may be a default speed or a speed selected by the driver, and to cause the speed at which the vehicle 100 rolls back to be reduced if it exceeds the predefined speed. The controller 201B is configured to subtract the magnitude of the received measured speed from the predefined speed to determine an error value 901 that is provided to the torque determination function 402. The torque determination function 402 is configured to determine proposed torque values that increase as the error values become increasingly negative, and provide no output signal 403 requesting torque (or only determine proposed torque values that are relatively small), when the error value 901 is positive. In an embodiment, the determined torque values are also arranged to increase in dependence on the rate at which the negative error is increasing.

Figure 10:
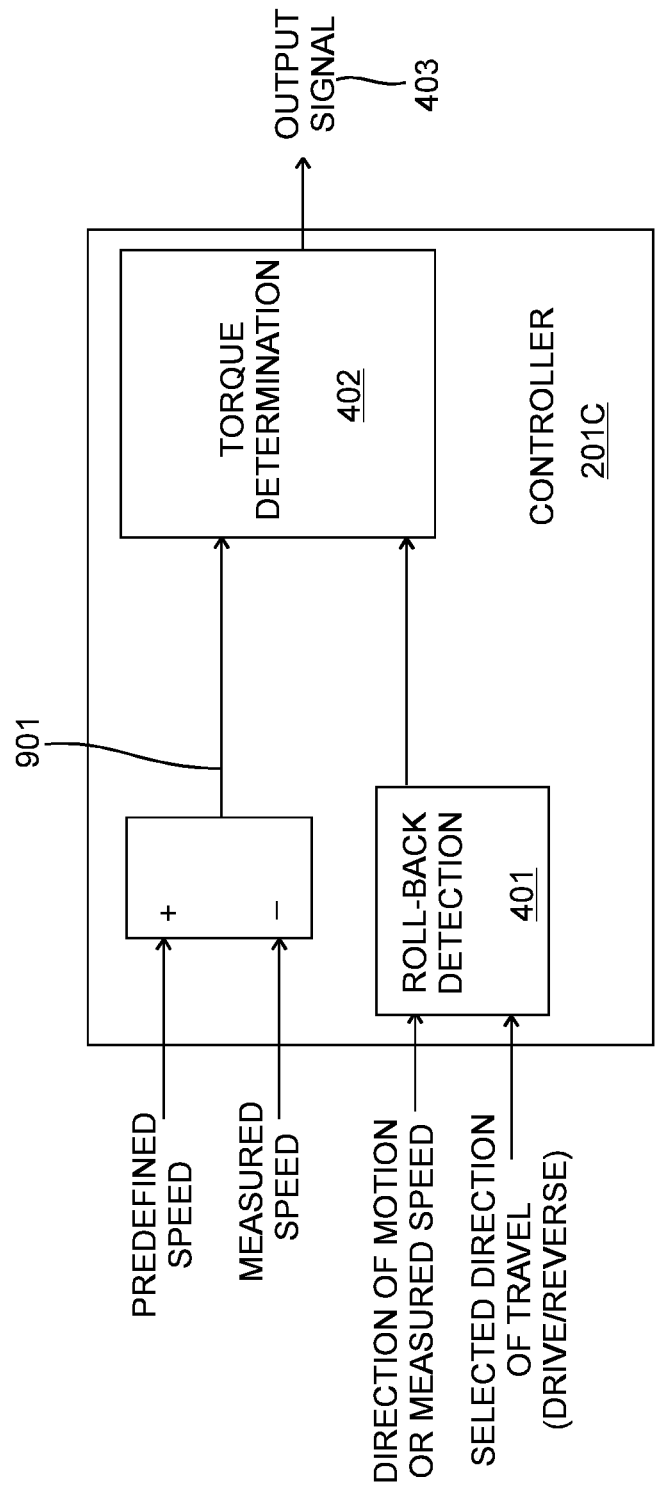
FIG. 10 shows a functional flow block diagram illustrating operations performable by yet another controller embodying the present invention.

Another alternative controller 201C embodying the present invention is illustrated by a functional flow block diagram shown in FIG. 10. The controller 201C in FIG. 10 is a negative feedback controller that is similar to the controller 201B illustrated in FIG. 9. Thus, it is arranged to allow the vehicle 100 to roll-back with speeds up to a predefined speed, and cause the speed at which the vehicle 100 rolls back to be reduced if it exceeds the predefined speed.

In the embodiment of FIG. 10, the torque determination function 402 is configured to determine proposed torque values when the roll-back detection function 401 determines that the direction of motion of the vehicle 100 is in the opposite direction to the selected direction of travel. However, unlike the controller 201B of FIG. 9, the controller 201C of FIG. 10 is arranged to provide an output signal 403 indicative of the proposed torque values even when the accelerator pedal 108 is being depressed. The advantage of such an arrangement is that when the vehicle 100 rolls down a slope in an opposite direction to the selected direction of travel, a driver of the vehicle 100 may attempt to control the speed of the vehicle 100 using the accelerator pedal 108. However, at times when the depression of the accelerator pedal 108 results in an insufficient request for torque from the motor(s) 102, 105 to maintain the magnitude of the speed of the vehicle below the predefined speed, the controller 201C provides an output signal 403 to request torque to reduce the speed back to the predefined speed.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM or EEPROM); flash memory; or electrical or other types of medium for storing such information/instructions.

The blocks illustrated in the FIGS. 6, 7A and 7B may represent steps in a method and/or sections of code in the computer program 204. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A controller for a vehicle, the controller configured to:
receive an indication of a user selected direction of travel;
receive an indication of the direction of motion of the vehicle;
determine a proposed torque value in dependence on the direction of motion being an opposite direction to the selected direction of travel; and
provide an output signal configured to cause a motor to apply an applied torque, in dependence on the proposed torque value, to oppose motion in said opposite direction,
wherein the applied torque is not sufficient to bring the vehicle to a halt, and
wherein the controller is configured to determine the proposed torque value in dependence on an indication of a rate of increase in speed of the vehicle and/or an indication of a gradient that the vehicle is positioned on; and the controller is configured to determine an indication of the rate of increase in speed of the vehicle.

2. The controller for a vehicle according to claim 1, wherein the proposed torque value is arranged to be proportional to the rate of increase in speed of the vehicle and/or the gradient that the vehicle is positioned on.

3. The controller for a vehicle according to claim 1, wherein the controller is configured to receive the indication of speed of the vehicle.

4. A controller for a vehicle, the controller configured to:
receive an indication of a user selected direction of travel;
receive an indication of the direction of motion of the vehicle;
determine a proposed torque value in dependence on the direction of motion being an opposite direction to the selected direction of travel; and
provide an output signal configured to cause a motor to apply an applied torque, in dependence on the proposed torque value, to oppose motion in said opposite direction,
wherein the applied torque is not sufficient to bring the vehicle to a halt, and
wherein the controller is a closed-loop controller having the speed of the vehicle as an input; and the controller is configured to:
determine proposed torque values that increase in relation to the speed of the vehicle up to a predefined maximum speed; or
determine proposed torque values that allow the speed of the vehicle to increase up to a predefined speed and reduce the speed of the vehicle in dependence on the speed of the vehicle being above the predefined speed.

5. A controller for a vehicle, the controller configured to:
receive an indication of a user selected direction of travel;
receive an indication of the direction of motion of the vehicle;
determine a proposed torque value in dependence on the direction of motion being an opposite direction to the selected direction of travel; and
provide an output signal configured to cause a motor to apply an applied torque, in dependence on the proposed torque value, to oppose motion in said opposite direction,
wherein the applied torque is not sufficient to bring the vehicle to a halt,
wherein the controller is further configured to receive an indication of speed of the vehicle and determine the proposed torque value in dependence on the speed of the vehicle, and
wherein the proposed torque value is proportional to the speed of the vehicle.

6. The controller for a vehicle according to claim 5, wherein the controller is further configured to receive signals indicative of user requests for torque received at an accelerator pedal and determine the proposed torque value in dependence on receiving no indication of a user request for torque in a period including the current time.

7. The controller for a vehicle according to claim 5, wherein the controller is configured to provide the output signal to cause a motor of the vehicle to automatically provide torque to oppose motion in the opposite direction to the selected direction of travel, in dependence on receiving an indication that brakes of the vehicle are not being applied.

8. The controller for a vehicle according to claim 5, wherein the controller further comprises an electronic memory device having instructions stored therein; and an electronic processor electrically coupled to the electronic memory device and configured to access the electronic memory device and execute the instructions to determine the proposed torque value.

9. A system comprising the controller of claim 5 and a sensor configured to sense speed of the vehicle and provide an indication of the speed to the controller.

10. The system according to claim 9, wherein the system comprises a user input device configured to provide a signal to the controller indicating:
a user selected direction of travel; or
selection or deselection of a creep mode in response to a corresponding user input.

11. A vehicle comprising the system of claim 9.

12. The system comprising the controller of claim 9, wherein the sensor is configured to sense the rotational speed of an electric motor of the vehicle.

13. The system comprising the controller of claim 9, wherein the system comprises an electric motor configured to produce torque in dependence on the proposed torque value provided by the controller.

14. A vehicle comprising the controller of claim 5.

15. A method of controlling speed of a vehicle, the method comprising:
receiving an indication of a user selected direction of travel;
receiving an indication of the direction of motion of the vehicle;
determining a proposed torque in dependence on the direction of motion being an opposite direction to the selected direction of travel; and
causing a motor to apply the proposed torque to oppose motion in said opposite direction,
wherein the proposed torque is not sufficient to bring the vehicle to a halt
the method further comprising receiving an indication of speed of the vehicle and determining the proposed torque value in dependence on the speed of the vehicle,
wherein the proposed torque value is proportional to the speed of the vehicle.

16. A computer program which when executed by a processor causes the processor to perform the method according to claim 15.

17. A non-transitory computer-readable storage medium having instructions stored therein which when executed on a processor cause the processor to perform the method according to claim 15.

* * * * *